United States Patent [19]
Van Ligten

[11] Patent Number: 5,820,146
[45] Date of Patent: Oct. 13, 1998

[54] HAND CART FOR THE TRANSPORT OF PERSONS AND LUGGAGE

[76] Inventor: Robert Hermanus Van Ligten, Viale C. Cattaneo 23, CH-6900 Lugano, Switzerland

[21] Appl. No.: 617,770
[22] PCT Filed: Sep. 19, 1994
[86] PCT No.: PCT/IB94/00280
  § 371 Date: Mar. 19, 1996
  § 102(e) Date: Mar. 19, 1996
[87] PCT Pub. No.: WO95/08466
  PCT Pub. Date: Mar. 30, 1995

[30] Foreign Application Priority Data

Sep. 20, 1993 [CH] Switzerland ............. 2823/93

[51] Int. Cl.$^6$ ..................... B62M 1/00
[52] U.S. Cl. ............. 280/87.041; 280/38; 280/47.19; 280/47.35
[58] Field of Search ........... 280/47.18, 47.19, 280/47.28, 47.29, 47.315, 47.35, 47.371, 87.041, 87.042, 35, 38, 639, 651, 655

[56] References Cited

U.S. PATENT DOCUMENTS

| | | | |
|---|---|---|---|
| 1,289,361 | 12/1918 | Bastman | 280/87.041 |
| 2,419,422 | 4/1947 | Schulein | 280/651 |
| 2,582,143 | 1/1952 | Maas | 280/87.042 |
| 2,693,968 | 11/1954 | Bateman et al. | 280/651 |
| 2,715,533 | 8/1955 | Strausburg | 280/651 |
| 3,785,669 | 1/1974 | Doheny | 280/47.18 |
| 4,167,225 | 9/1979 | Fragoso | 280/87.042 |
| 4,274,647 | 6/1981 | Drake, Jr. | 280/87.042 |
| 4,802,681 | 2/1989 | Hung | 280/47.18 |
| 5,033,759 | 7/1991 | Wix | 280/35 |

FOREIGN PATENT DOCUMENTS

| | | | |
|---|---|---|---|
| 0294249 | 12/1988 | European Pat. Off. | |
| 2467003 | 4/1981 | France | |
| 3138095 | 4/1983 | Germany | 280/87.041 |
| 3537522 | 4/1987 | Germany | |
| 616723 | 1/1949 | United Kingdom | 280/87.041 |
| 2180801 | 4/1987 | United Kingdom | |

*Primary Examiner*—Brian L. Johnson
*Assistant Examiner*—Frank Vanaman
*Attorney, Agent, or Firm*—Speckman Pauley Petersen & Fejer

[57] ABSTRACT

A hand cart which can be used for transporting both persons and luggage. The hand cart is easily manipulated, is flexible and can be handily folded, so that the hand cart is suitable for transporting goods in narrow passages. The hand cart has a support and draw bar that can be swivelled with respect to a stepboard, so that in a folded-up position, the hand cart at least partially forms a plane parallel to the stepboard. A luggage-carrying surface of the hand cart is available when the hand cart is in a partially folded position, and the hand cart can be driven on only two front wheels when in such partially folded position.

12 Claims, 3 Drawing Sheets

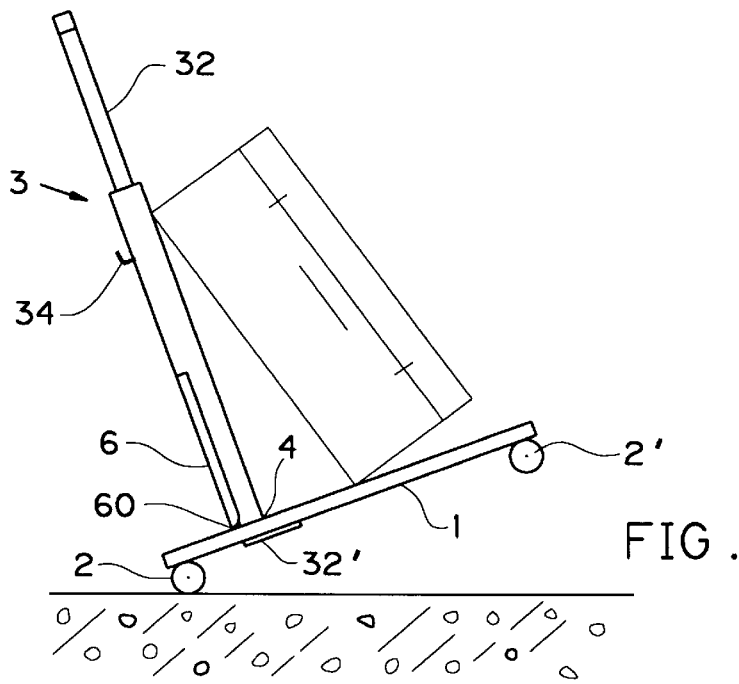
FIG. 3
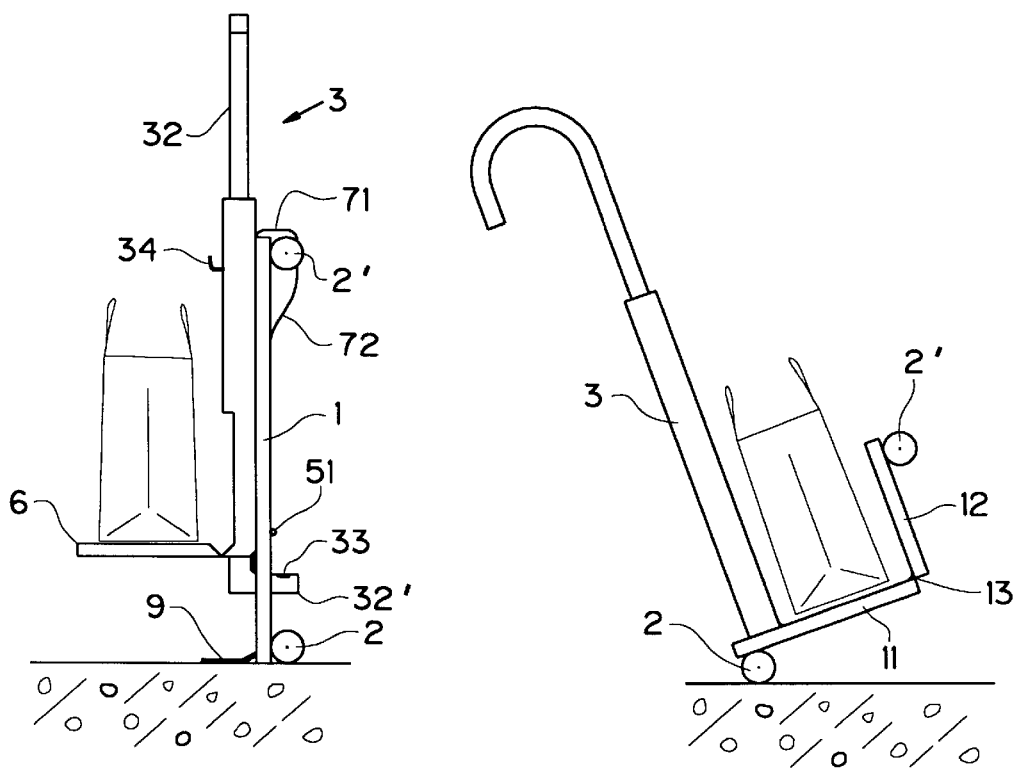
FIG. 4a
FIG. 4b

HAND CART FOR THE TRANSPORT OF PERSONS AND LUGGAGE

BACKGROUND OF THE INVENTION

1. Field of the Invention

This invention relates to a multi-functional roller cart for transporting passengers and/or packages, having a stepboard, at least two rollers which are forward with respect to the direction of travel, at least one rear roller, and a support and draw bar disposed on the stepboard.

2. Description of Prior Art

Roller boards, also known as skateboards, are mainly used by young people for travel and as a toy. In general they have two front and two rear rollers, wherein each roller pair is connected with a movable wheel shaft. Such roller boards are small and are very maneuverable because of the special seating of the wheel shafts. In addition, they also allow rapid movement even over territory with little free space in which bicycles, for example, could no longer be used. However, a disadvantage of these roller boards is that they require the user to have a certain dexterity and training.

The advantages of these roller boards as means for general passenger transport have already been noted, so that roller boards are already known which can also be used by untrained people. For example, U.S. Pat. No. 4,274,647 and French Patent Reference 2,467,003 disclose roller boards having a guide bar on which the rider supports himself and by which he can determine the direction of travel. The propulsion of the roller board takes place either by the power of his own body by propelling with a foot against the ground, or by a drive motor disposed on the roller board.

Although with this the roller board can be employed as generally usable transportation, it still has considerable disadvantages. In most cases there is the desire of simultaneously transporting packages. For this reason roller devices are employed in storage facilities which are designed analogously with the known two-wheeled scooter for children and have support surfaces for transporting packages. Some known roller devices even have three wheels, wherein two are disposed in front and one in the rear. However, these roller devices are relatively large, clumsy and considerably less maneuverable than the above described roller boards.

A three-wheeled roller device or trottinett with a guide bar is known from German Patent Reference 35 37 522, which makes the transportation of packages possible. This roller device has one wheel in front and two in the rear. The guide bar is pivotally mounted in a joint, so that in the vertical position it is used as a guide bar of a passenger transport medium, and in the inclined position is used as the draw bar of a package hand cart, wherein the stepboard of the roller device is used as a support surface for the packages. The guide bar can furthermore be completely pivoted down, so that the roller device can be folded together and easily carried.

However, such known roller device is also clumsy when functioning as a package cart and can hardly be used on pedestrian walks or shopping streets.

SUMMARY OF THE INVENTION

It is therefore one object of this invention to create a transport medium for passengers and/or package transport which is easy to operate, maneuverable, easily folded and particularly useful for package transport even in narrow passages.

The above and other objects are achieved with a multi-functional roller cart having a stepboard, at least two front rollers, at least one rear roller and a support and draw bar that pivots with respect to the stepboard to a folded-up position that is generally parallel to a plane of the stepboard. At least one carrier surface receives packages when in a partially folded state, and the front rollers are positioned approximately flush or extend forward of the stepboard so that when in a folded-up position the cart can be moved or rolled using the two front rollers.

Further advantageous embodiments are described below in more detail.

The roller cart of this invention can be multi-functionally employed and is just as maneuverable as known roller boards. On one hand, the roller cart of this invention can be employed purely as a passenger transport medium, wherein the support bar makes guiding the roller cart easier, so that the roller cart of this invention can also be used by untrained riders. In this function there is sufficient space available on the stepboard for taking along relatively smaller packages. In one preferred embodiment, a support surface, on which packages can be supported is also provided in front of the support bar.

However, the roller cart of this invention can also be used purely as a package transport medium and combines two different forms of transport means. In the first form the entire stepboard surface acts as the support surface for the packages. The roller cart is simply tilted around the front wheel shaft, which lies closer to the support bar, by the user, and the packages are placed against and held by the support and draw bar. The roller cart of this invention, used as a package cart, can be pushed by the user on the two front rollers in a direction opposite to the previous direction of travel and the user becomes a pedestrian.

But one particular advantage of the roller cart in accordance with this invention is that the second form as purely a package transport medium is extremely space-saving and can therefore also be used in narrow passages or on stairs. The roller cart can be completely folded up so that it essentially appears as do known foldable package carts, such as those that transport shopping bags. For this purpose the stepboard is pivoted up in the direction toward the support and draw bar, so that only the two front rollers touch the ground. In a preferred embodiment a carrier plate arranged in front of the support and draw bar, or a portion of the stepboard which is not pivoted up, are used as support surface for the packages.

In preferred embodiments of this invention the carrier plate or the entire stepboard can be pivoted up so that they rest against the support and draw bar, so that the roller cart can be easily transported and stored in a space-saving manner when not in use.

A further advantage of the roller cart in accordance with this invention is that it can be folded up completely so that it can be easily carried or stored in a space-saving manner when not in use.

BRIEF DESCRIPTION OF THE DRAWINGS

One embodiment of this invention is represented in the attached drawings and will be explained in the subsequent drawings wherein:

FIG. 3 is a side view of the roller cart in a position used as a baggage transport medium for large-sized packages;

FIG. 4a is a side view of the roller cart in a partially folded state, shown as a baggage transport medium;

FIG. 4b is a side view of another preferred embodiment of the roller cart, shown in a partially folded state;

DESCRIPTION OF PREFERRED EMBODIMENTS

Figure 1:
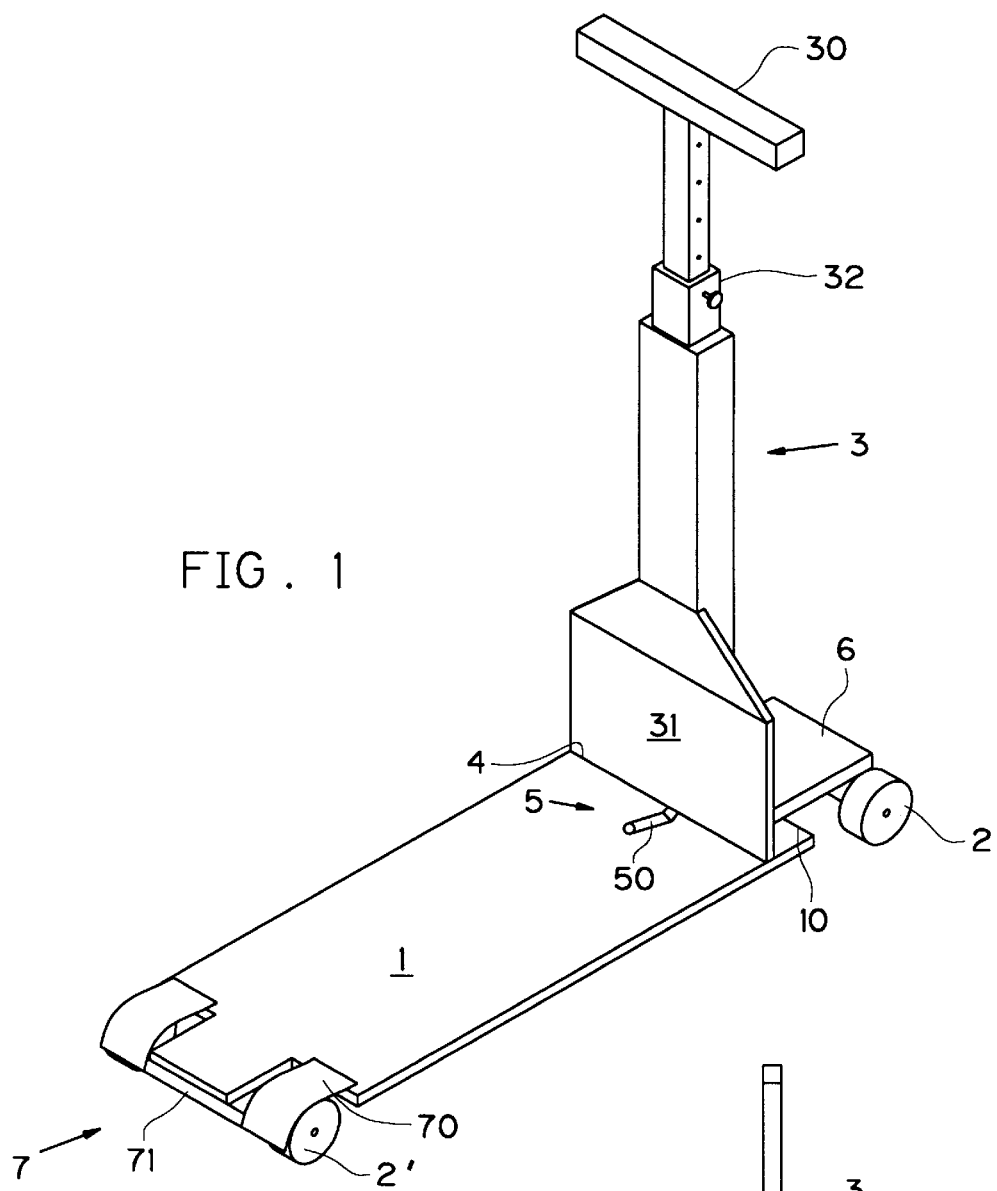
FIG. 1 is a perspective schematic view of a multi-functional roller cart in accordance with this invention in the position used as a passenger transport medium.
Figure 2:
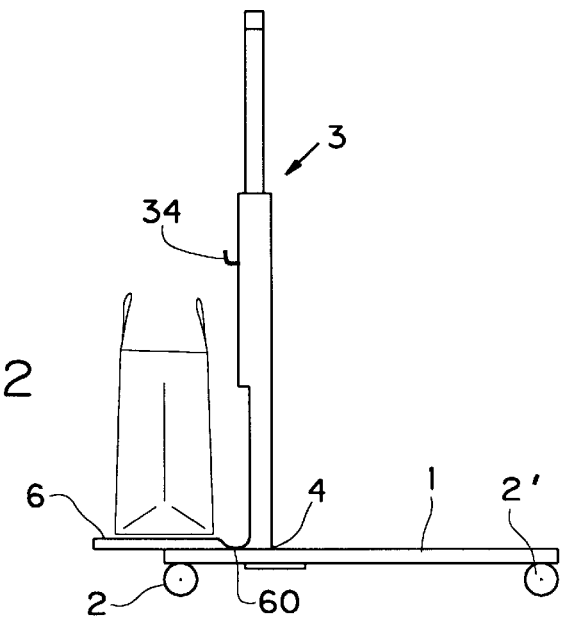
FIG. 2 is a side view of the roller cart shown in FIG. 1.
Figure 6:
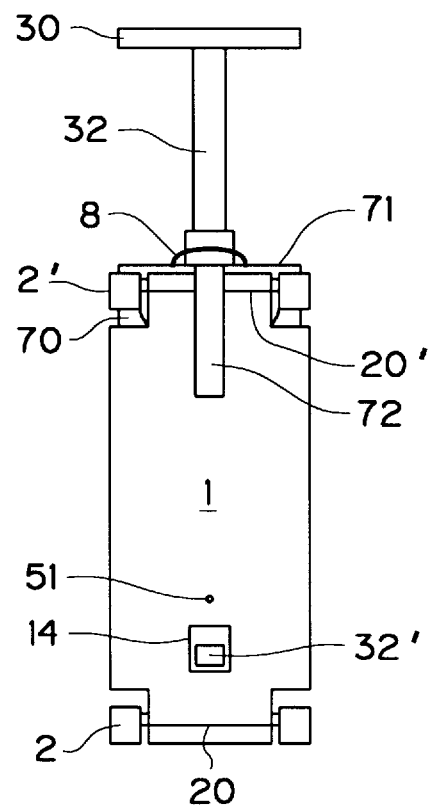
FIG. 6 is a bottom view of the completely folded up roller cart.

The roller cart in accordance with this invention is represented in FIGS. 1 and 2 in its position of employment as a passenger transport medium, wherein it is also possible in this position to simultaneously carry along packages. The roller cart has a stepboard 1, which is used as a surface for the rider to stand on and on which it is possible to simultaneously transport packages. Rollers are fastened on the underside of the stepboard 1, wherein at least two front rollers 2 are provided on a side at the front in a direction of travel, and at least one rear roller 2' on a back end. In the embodiment shown in FIG. 1 there are two rear rollers 2' for reasons of stability. The front and rear pairs of rollers 2, 2' respectively have mutually movable wheel shafts 20, 20', as shown in FIG. 6, so that the stepboard 1 and the rollers 2, 2' form a roller cart, also called skateboard. Thus, because of the special seating of the rollers 2, 2', the roller cart can be steered and propelled by displacing the center of gravity of the body of the rider, the same as with the known skateboards. Since the stepboard 1 rocks with respect to the rollers 2, 2', it has cutouts above the rollers 2, 2', so that the rollers 2, 2' are not covered by the stepboard 1 and cannot possibly be obstructed by the stepboard 1. The outer dimensions of the front roller 2 are either disposed approximately flush with a front edge of the roller cart or project beyond it.

The roller cart in accordance with this invention has a braking device 7. At least one brake pedal 70 is disposed in a rear area of the stepboard 1. In this example a flexible plate is provided above each wheel as the brake pedal 70. Both plates are connected by a common strip 71 mounted freely suspended behind the stepboard 1. The strip 71 makes a transition into a braking element 72 which is located freely suspended approximately in a center area below the rear wheel shaft 20'. If now a heel pedal is actuated, the brake element 72 comprising a piece of rubber, is lowered to the ground and brakes the roller cart. In the process it always acts in the center area below the rear rollers 2' regardless of which brake pedal was actuated. It furthermore does not act on the rollers 2' themselves, so that the rider does not experience a disturbance of equilibrium.

A support and draw bar 3 is disposed on the stepboard 1. In the position of employment represented in FIGS. 1 and 2, the support and draw bar 3 rests approximately perpendicularly on the stepboard 1 and is fixed in place with respect to the stepboard 1 and makes a transition into a handle 30 at its upper end. In this position of employment the support and draw bar 3 is used as a support for the rider and in addition aids in displacement of a center of gravity, in the course of guiding the roller cart. In a preferred embodiment the draw and support bar 3 is longitudinally adjustable, so that the height of the grip can be adjusted to correspond to each rider. Although the term bar is used, the support and draw bar need not absolutely require a bar shape. As shown in the drawings, the support and draw bar 3 can also be constructed in a columnar form. A lower part 31 of the support and draw bar 3 is preferably embodied as flat and extends over approximately an entire width of the stepboard 1. The support and draw bar 3 as well as the stepboard 1 are preferably made of wood or a hard plastic material. A square tube 32 is displaceably mounted in the flat part 31. The square tube 32 can additionally be telescopically extendible.

The support and draw bar 3 is pivotally connected with the stepboard 1 by means of a first hinge 4, wherein the hinge 4 extends in a front area of the stepboard 1, over its width. However, the support and draw bar 3 can be fixed in place in the state represented in FIGS. 1 and 2, which corresponds to the folded-open position of the roller cart.

Figure 5:
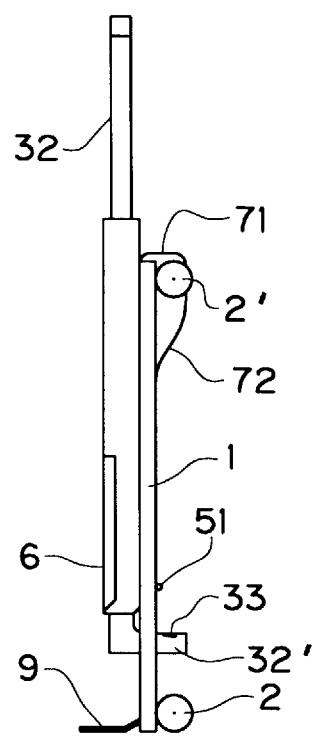
FIG. 5 is a side view of a completely folded up roller cart.

This fixation can be best seen in FIGS. 5 and 6. A lower end 32' of the square tube 32 passes through the stepboard 1, which has an elongated hole 14 at this place. The lower end 32' is angled and preferably forms a right angle. Thus, in the folded-open state of the roller cart the angled end 32' of the square tube rests against an underside of the stepboard 1. Arresting means 5 for fixing the angled end 32' of the square tube are disposed on the stepboard 1 itself. The arresting means 5 comprise a pivot lever 50 and a screw 51 with a T-shaped head, which is separately screwed into the pivot lever 50, separated by a nut, not shown in the drawing. pivot lever 50 is located on the top of the stepboard 1, wherein only a small actuating lever projects away from the stepboard surface. The screw 51 extends through the stepboard 1 and projects from the underside of the stepboard 1. The nut is also disposed on the underside of the stepboard 1. When in the folded-open position as shown in FIGS. 1 and 2, the T-shaped head of the screw 51 projects into a slit 33 located in the angled end 32' of the square tube 32. The support and draw bar 3 is fixed in the folded-open position of employment shown in FIGS. 1 and 2 if the T-shaped head is rotated by the pivot lever 50 in such a way the T-shaped head of the screw 51 is positioned transversely with respect to the slit 33, and thereby locked so that the square tube 32 can no longer be pivoted. The lower end 32' of the square tube 32 is simultaneously pulled against the underside of the stepboard 1 and this reinforces the fixation.

Other known devices for fixing the support and draw bar extending at right angles away from the stepboard 1 are also possible.

The roller cart of this invention has a carrier plate 6 at the front end and ahead of the support and draw bar 3. This is also preferably pivotally fastened by means of a second hinge 60 on the stepboard 1 or on the support and draw bar 3. The carrier plate 6 is used as a support surface for packages or goods. If the roller cart is used only for transporting people, the carrier plate 6 can be pivoted upward until it comes completely to rest against the support and draw bar 3, wherein both elements can be shaped in such a way that they are flush in one plane.

Fastening means 34, for example in the form of hooks, can be disposed on the support and draw bar 3 for transporting additional packages.

Thus, in the position of employment represented in FIGS. 1 and 2, the roller cart can be employed purely as a people transporting medium or as an additional package transporting medium. The roller cart is preferably propelled by the rider himself for example by pushing on the ground with a foot. The packages can be taken along on the carrier plate or on the stepboard 1 itself. In this case the portion of the support and draw bar 3 which is embodied flat is used as a support for the packages. Additional packages can be fastened on the fastening means of the support and draw bar 3.

But the roller cart in accordance with this invention can also be employed purely as a package transporting medium.

The position of employment corresponding to this is represented in FIG. 3. Now the roller cart is pushed in the opposite direction and in the process is held in a slightly inclined position by the user so that it rests on the ground only with both its front rollers 2 which, however, are now located relatively rearward. The roller cart is pushed by means of the support and draw bar 3 which is fixed with respect to the stepboard 1. The stepboard 1 is used as support surface and the support and draw bar 3 acts as a lateral support.

A further position of employment is represented in FIGS. 4a and 4b in two different embodiments. The roller cart is shown in the position of rest in FIG. 4a, and in FIG. 4b while it is being moved. In this state the roller cart is partially folded up and is only used purely as a package transporting medium.

In FIG. 4a the entire stepboard 1 is pivoted up, so that the stepboard 1 rests against the support and draw bar 3 and is fixed in this position. Fixation can take place by interlock or by the arresting means 5. The roller cart folded up in this way rests on the ground only with the front rollers 2, which are not impeded by the upward pivoted stepboard 1. The carrier plate 6, which extends approximately perpendicular with respect to the support and draw bar 3, is used as the support surface for the packages. In turn, the support and draw bar 3 is used for pushing or pulling this small, compact baggage transporting medium and as a lateral support for the baggage. So that the roller cart can stand by itself even in this folded-up position, a support 9 is attached to the stepboard 1 in the area of the front rollers 2. This can be a pivotal angle iron, for example.

The embodiment represented in FIG. 4b has a foldable stepboard 1. A third hinge 13 extending transversely with respect to the direction of movement divides the stepboard 1 into two parts. The rear part 12 can be pivoted up together with the rear rollers 2', so that it forms a generally parallel surface with the support and draw bar 3. The front part 11 of the stepboard 1 remains in its approximately horizontal position and is used as the support surface for the packages. In this case the packages are held laterally twice, by the pivoted-up rear part 12 of the stepboard 1 and by the support and draw bar. Here, too, the roller cart is pulled or pushed on its front rollers 2. Still another embodiment is shown in FIG. 4b. The support and draw bar 3 has two handles only one of which is visible. These handles are bent, so that they can be suspended over the shoulders as straps. In this way the folded-up roller cart can be carried on a person's back, like a backpack. This is particularly sensible where it is necessary to travel extensive distances which cannot be used for rolling, such as stairs.

The roller cart in accordance with this invention in the completely folded state is represented in FIGS. 5 and 6. It takes up very little space in this state and can be simply carried or stored. The stepboard 1 is pivoted up completely along the support and draw bar 3 so that the stepboard 1 rests against the support and draw bar 3. As already described, it is maintained fixed in this position. The lower angled end 32' of the square tube 32 is of such a size that it does not project past the rollers 2, 2'. The carrier plate 6 is also pivoted until it completely rests against the support and draw bar 3. The support and draw bar 3 and the carrier plate 6 are preferably shaped such that they are flush in one plane in the folded-up state. In one example the carrier plate 6 is divided into two and beveled in the area of the second hinge 60 so that in the pivoted-up state encloses the support and draw bar 3. In another example, not represented in the drawing, the support and draw bar 3 has a recess corresponding to the dimensions of the carrier plate.

Again, the completely folded-up roller cart rests on the ground with its front rollers 2' and the support 9 makes possible independent standing in the completely folded-up state. Furthermore, a carrying handle is attached to the underside of the stepboard 1, so that the stepboard 1 can be easily carried in the folded-up state. If the already described bent handles are disposed on the support and draw bar 3, the roller cart can again be carried on the shoulders. Since the fastening means of the support and draw bar 3 are accessible, it is still possible to transport packages, for example by suspending a bag from them.

Further embodiments are possible. It is therefore possible in another embodiment, not represented in the drawing, to connect the support and draw bar 3 with the wheel shaft of the front rollers, so that in the folded-open state it no longer has a rigid connection with the stepboard, but instead can be used as a guide bar.

The roller cart can also be operated by means of an external drive element, for example an electric motor.

I claim:

1. In a multi-functional roller cart for transporting passengers and/or packages, having a stepboard (1), at least two rollers (2) located in front with respect to a direction of travel, and at least one rear roller (2'), and a support and draw bar (3) disposed on the stepboard (1), the improvement comprising:

the support and draw bar (3) pivotally mounted with respect to the stepboard (1) and generally parallel with respect to the stepboard (1) in a partially folded-up state of the roller cart, at least one carrier surface (11, 6) for receiving packages in the partially folded-up state, the at least one carrier surface (11, 6) positioned generally perpendicular with respect to a direction of extension of the support and draw bar (3);

the front rollers (2) positioned approximately flush with the front edge (10) of the stepboard (1), so that the partially folded-up roller cart can be transported on the two front rollers (2); and the stepboard (1) separated by a transversely extending hinge (13), and in the partially folded-up state a rear part (12) of the stepboard (1) generally parallel with respect to the support and draw bar (3) and a front part of the stepboard (1) forming the carrier surface (11).

2. A roller cart in accordance with claim 1, wherein a carrier plate forms the at least one carrier surface (6) in the partially folded-up state of the roller cart, and the carrier plate is positioned in front of the support and draw bar (3).

3. A roller cart in accordance with claim 2, wherein the roller cart can be folded up so that the stepboard (1) rests against the support and draw bar (3) and the carrier plate pivots and rests against the support and draw bar (3).

4. A roller cart in accordance with claim 3, further comprising a support leg (9) mounted with respect to the stepboard (1) in an area near the front rollers (2).

5. A roller cart in accordance with claim 5, wherein the at least two rear rollers (2') and the respective front rollers (2) have common movable wheel shafts (20, 20') for steering the roller cart by inclining the stepboard (1).

6. A roller cart in accordance with claim 3, further comprising a brake pedal (7) disposed on the stepboard (1), acting on a brake element (72) positioned beneath a central portion of a rear wheel shaft (20') of the movable wheel shafts (20, 20') and acting on ground over which the brake pedal (7) moves when actuated.

7. A roller cart in accordance with claim 1, wherein the support and draw bar (3) is mounted at a general right angle with respect to the stepboard (1) and is secured against relative rotation.

8. A roller cart in accordance with claim 1, wherein the support and draw bar (3) is height-adjustable.

9. A roller cart in accordance with claim 1, wherein the support and draw bar (3) is flat at least in a lower area and extends approximately over an entire width of the stepboard (1).

10. A roller cart in accordance with claim 1, further comprising a support (9) mounted with respect to the stepboard (1) in an area near the front rollers (2).

11. In a multi-functional roller cart for transporting passengers and/or packages, having a stepboard (1), at least two rollers (2) located in front with respect to a direction of travel, and at least one rear roller (2'), and a support and draw bar (3) disposed on the stepboard (1), the improvement comprising:

the support and draw bar (3) pivotally mounted with respect to the stepboard (1) and generally parallel with respect to the stepboard (1) in a partially folded-up state of the roller cart, at least one carrier surface (11, 6) for receiving packages in the partially folded-up state, the at least one carrier surface (11, 6) positioned generally perpendicular with respect to a direction of extension of the support and draw bar (3);

the front rollers (2) positioned approximately flush with the front edge (10) of the stepboard (1), so that the partially folded-up roller cart can be transported on the two front rollers (2);

the support and draw bar (3) mounted at a general right angle with respect to the stepboard (1) and secured against relative rotation; and a lower end portion (32') of the support and draw bar (3) positioned at a general right angle where the support and draw bar (3) passes through the stepboard (1), and is fixedly mounted against relative rotation with respect to the stepboard (1) in an unfolded state of the roller cart.

12. A roller cart in accordance with claim 11, further comprising arresting means (5) fastened with respect to the stepboard (1), the arresting means (5) comprising a nut and a screw (51) with a T-shaped head, and the T-shaped head engageable with a slit (33) in the lower end portion (32').

* * * * *